United States Patent
Lee et al.

(10) Patent No.: US 10,222,928 B2
(45) Date of Patent: Mar. 5, 2019

(54) ELECTRONIC DEVICE

(71) Applicant: LG ELECTRONICS INC., Seoul (KR)

(72) Inventors: Sanghyuck Lee, Seoul (KR); Chulbae Lee, Seoul (KR); Euiseok Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 317 days.

(21) Appl. No.: 14/906,137

(22) PCT Filed: Dec. 5, 2013

(86) PCT No.: PCT/KR2013/011203
§ 371 (c)(1),
(2) Date: Jan. 19, 2016

(87) PCT Pub. No.: WO2015/012451
PCT Pub. Date: Jan. 29, 2015

(65) Prior Publication Data
US 2016/0154537 A1    Jun. 2, 2016

(30) Foreign Application Priority Data
Jul. 26, 2013 (KR) .................. 10-2013-0089160

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/017* (2013.01); *G06F 3/0484* (2013.01);
(Continued)

(58) Field of Classification Search
CPC ........ G06F 1/203; G06F 1/206; G06F 1/3231; G06F 21/35; G06F 3/017; G06F 3/0481;
(Continued)

(56) References Cited

U.S. PATENT DOCUMENTS 8,745,154 B1 * 6/2014 Froment ............... H04L 67/306
709/217
9,001,625 B2 * 4/2015 Essery .................. H04W 88/02
368/46
(Continued)

FOREIGN PATENT DOCUMENTS

KR    10-2008-0050991 A    6/2008
KR    10-2010-0017677    *    2/2010 ............. G06K 17/00
(Continued)

OTHER PUBLICATIONS

Bing et al., "Design of an Internet of Things-based smart home system;" IEEE; Jul. 2011; 4 pages.*
(Continued)

*Primary Examiner* — Linh K Pham
(74) *Attorney, Agent, or Firm* — Birch, Stewart, Kolasch & Birch, LLP

(57) ABSTRACT

Disclosed is an electronic device including a display unit that includes a main region and a sub region surrounding the main region, and a controller that, in response to an occurrence of an event, outputs to the sub region a second screen information associated with a first screen information that is output to the main region before the event occurs.

11 Claims, 15 Drawing Sheets

(51) Int. Cl.
- *G09G 5/00* (2006.01)
- *G06F 3/01* (2006.01)
- *G06F 3/0484* (2013.01)
- *G08C 17/00* (2006.01)
- *G06F 3/0488* (2013.01)
- *G06F 3/0486* (2013.01)
- *G09G 5/14* (2006.01)

(52) U.S. Cl.
CPC ........ *G06F 3/0486* (2013.01); *G06F 3/04847* (2013.01); *G06F 3/04883* (2013.01); *G08C 17/00* (2013.01); *G09G 5/00* (2013.01); *G09G 5/14* (2013.01); *G09G 2310/0232* (2013.01); *G09G 2340/14* (2013.01)

(58) Field of Classification Search
CPC .. G06F 3/0484; G06F 3/04847; G06F 3/0486; G06F 3/04883; G06F 3/0488; G06F 3/0416; G06F 2203/04108
See application file for complete search history.

(56) References Cited

U.S. PATENT DOCUMENTS

| | | | | |
|---|---|---|---|---|
| 9,600,171 | B2* | 3/2017 | Rhee | G06F 21/31 |
| 2003/0197740 | A1* | 10/2003 | Reponen | G06F 3/0362 |
| | | | | 715/810 |
| 2007/0283292 | A1* | 12/2007 | Bucher | G06F 3/0482 |
| | | | | 715/810 |
| 2008/0040671 | A1* | 2/2008 | Reed | G06F 3/0481 |
| | | | | 715/738 |
| 2009/0197615 | A1* | 8/2009 | Kim | H04M 1/605 |
| | | | | 455/456.1 |
| 2010/0107070 | A1* | 4/2010 | Devineni | B60H 1/00985 |
| | | | | 715/702 |
| 2010/0174987 | A1* | 7/2010 | Shin | G06F 3/0482 |
| | | | | 715/702 |
| 2010/0175008 | A1* | 7/2010 | Han | G11B 27/34 |
| | | | | 715/764 |
| 2010/0198425 | A1* | 8/2010 | Donovan | F24D 19/10 |
| | | | | 700/299 |
| 2010/0248788 | A1 | 9/2010 | Yook et al. | |
| 2012/0013557 | A1 | 1/2012 | Lee et al. | |
| 2012/0066629 | A1* | 3/2012 | Lee | G06F 3/04847 |
| | | | | 715/769 |
| 2012/0265363 | A1* | 10/2012 | Hung | F04D 27/004 |
| | | | | 700/300 |
| 2013/0012268 | A1* | 1/2013 | Whang | G06F 3/04895 |
| | | | | 455/563 |
| 2013/0194238 | A1* | 8/2013 | Sakai | H04N 21/4314 |
| | | | | 345/175 |
| 2014/0025224 | A1* | 1/2014 | Wong | G06F 1/203 |
| | | | | 700/300 |
| 2014/0198956 | A1* | 7/2014 | Forutanpour | G06K 9/00295 |
| | | | | 382/115 |
| 2014/0316581 | A1* | 10/2014 | Fadell | G05D 23/1904 |
| | | | | 700/276 |
| 2016/0299679 | A1* | 10/2016 | Park | G06F 1/163 |
| 2017/0115860 | A1* | 4/2017 | Youn | G06F 3/0482 |

FOREIGN PATENT DOCUMENTS

| | | |
|---|---|---|
| KR | 10-2010-0081577 A | 7/2010 |
| KR | 10-2011-0098197 A | 9/2011 |
| KR | 10-2012-0008328 A | 1/2012 |

OTHER PUBLICATIONS

Yan et al., "ZigBee-based Smart Home system design;" IEEE; 2010; 4 pages.*

* cited by examiner

[Fig. 1]
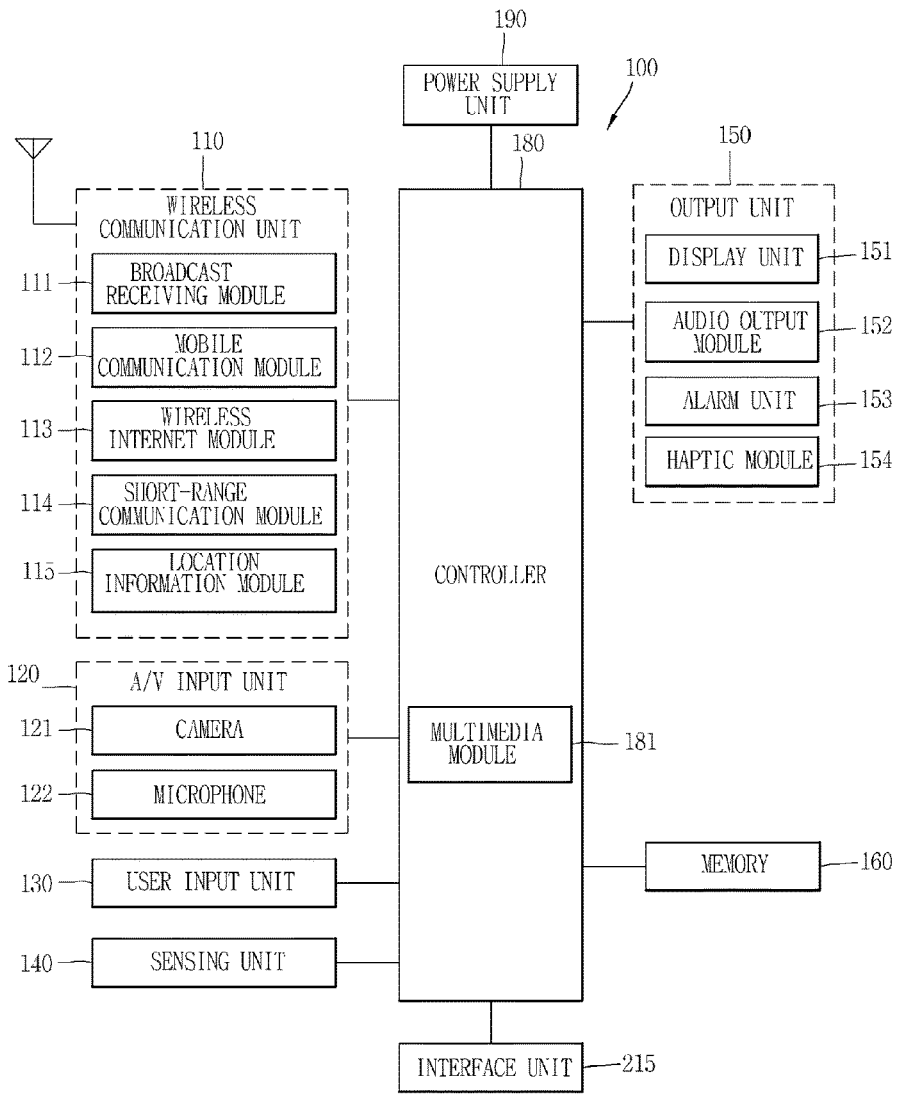
[Fig. 2a]
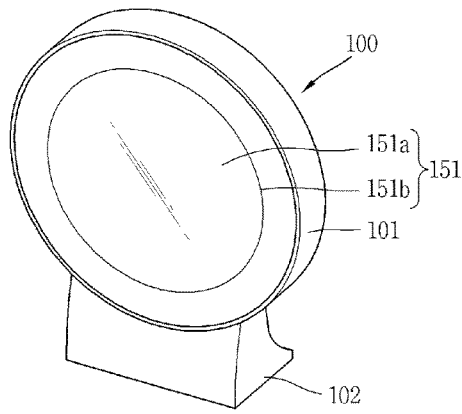

[Fig. 2b]
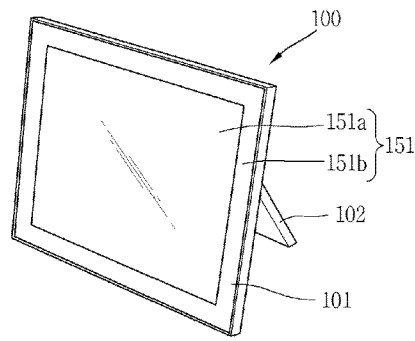
[Fig. 3a]
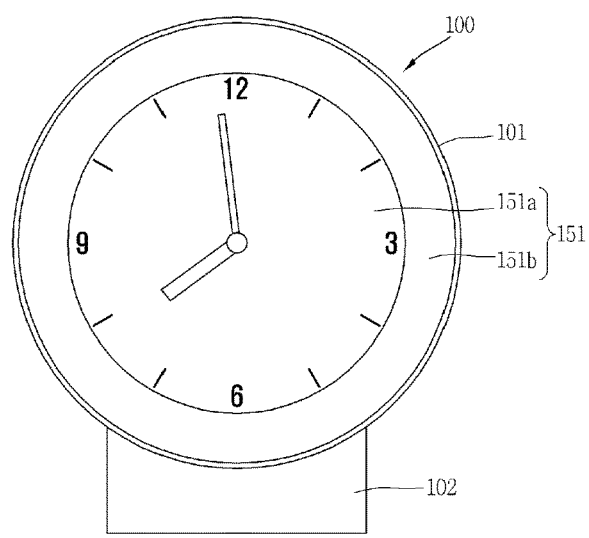
[Fig. 3b]
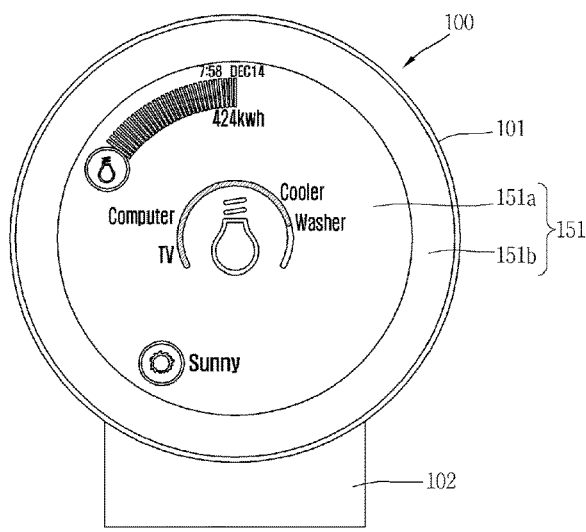

[Fig. 3c]
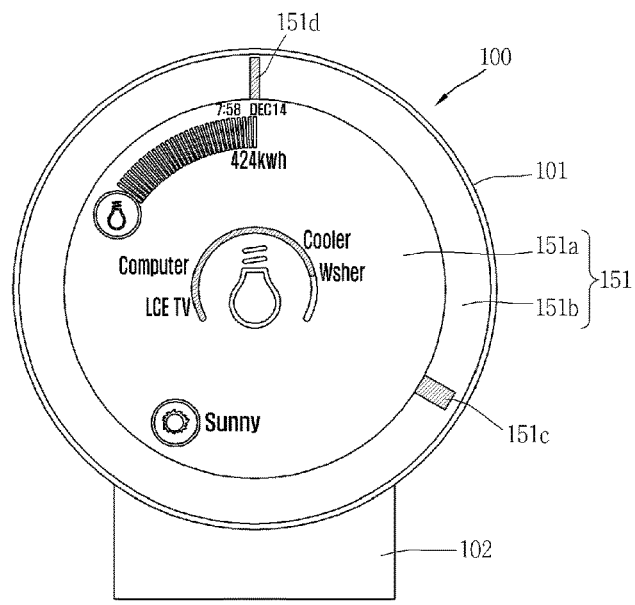
[Fig. 4]
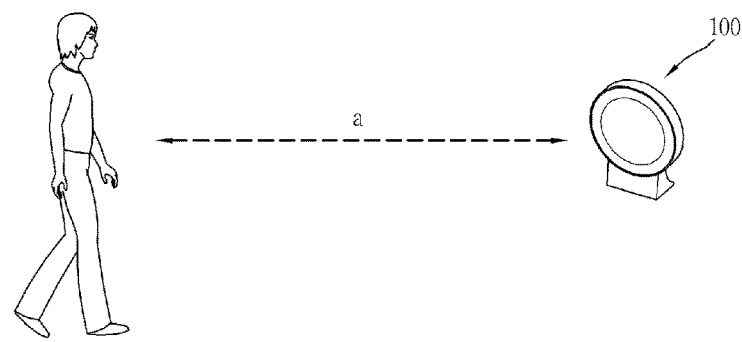
(a)
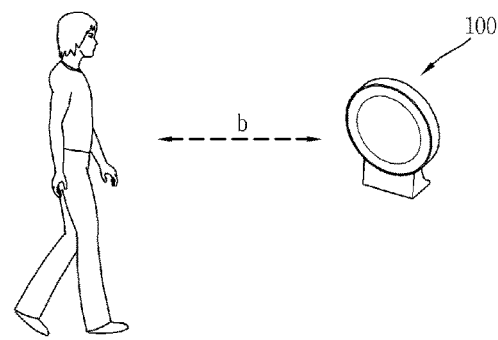
(b)

[Fig. 5a]
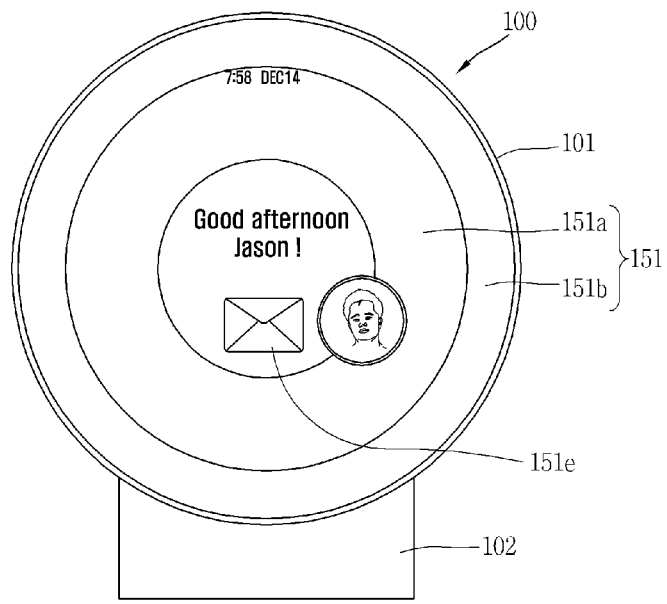
[Fig. 5b]
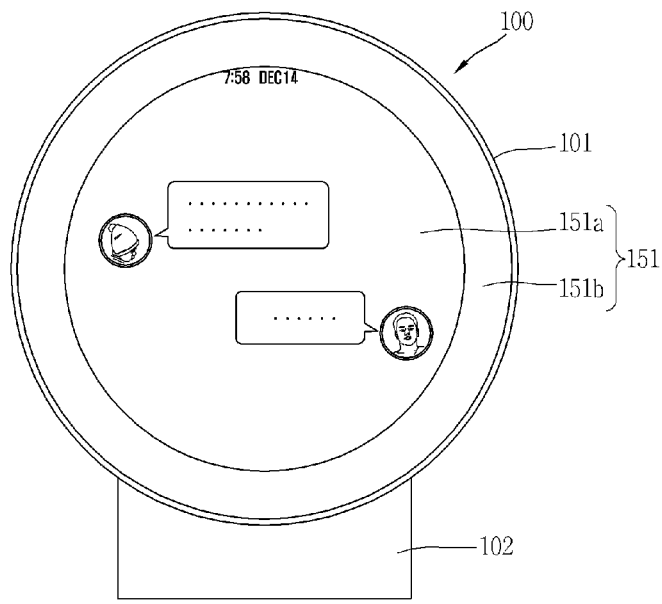

[Fig. 5c]
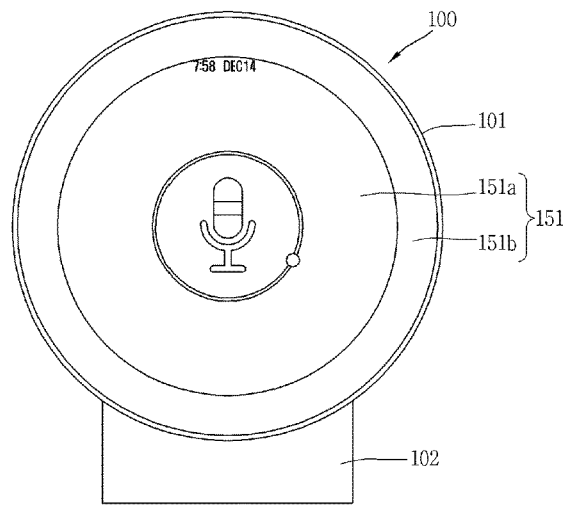
[Fig. 5d]
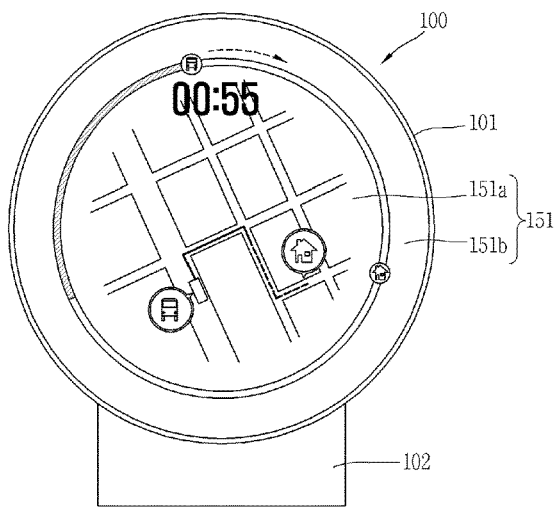
[Fig. 6]
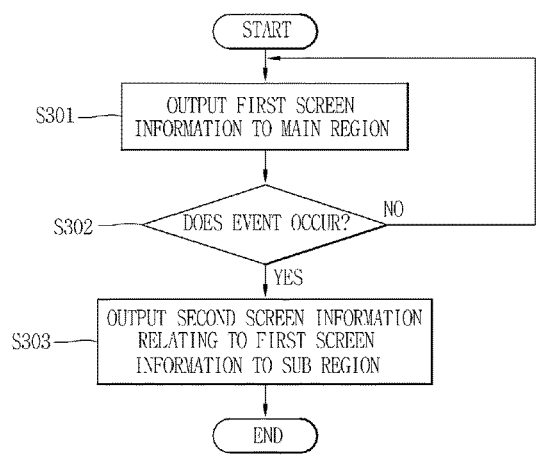

[Fig. 7]
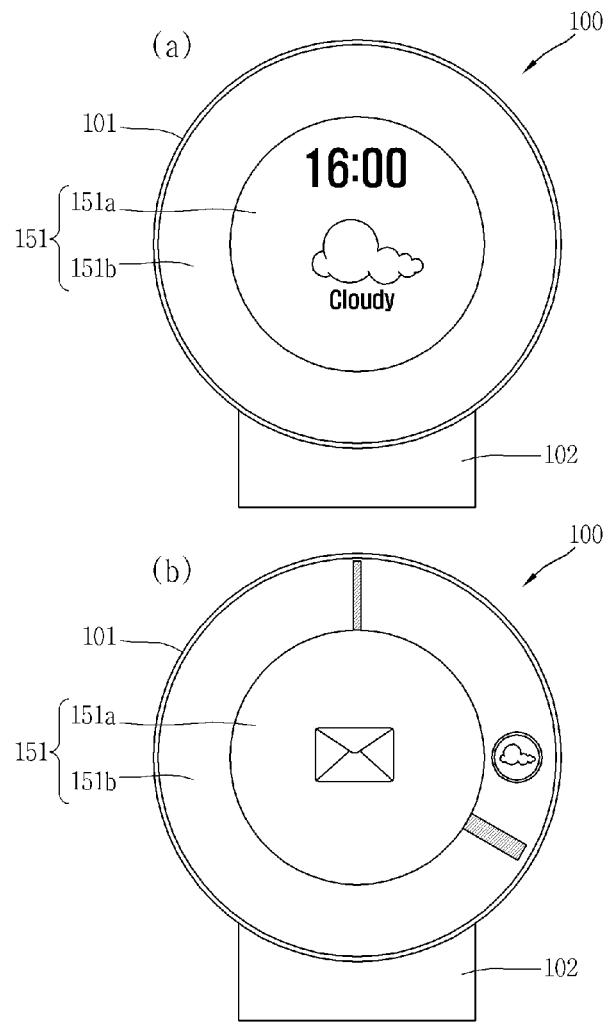

[Fig. 8]
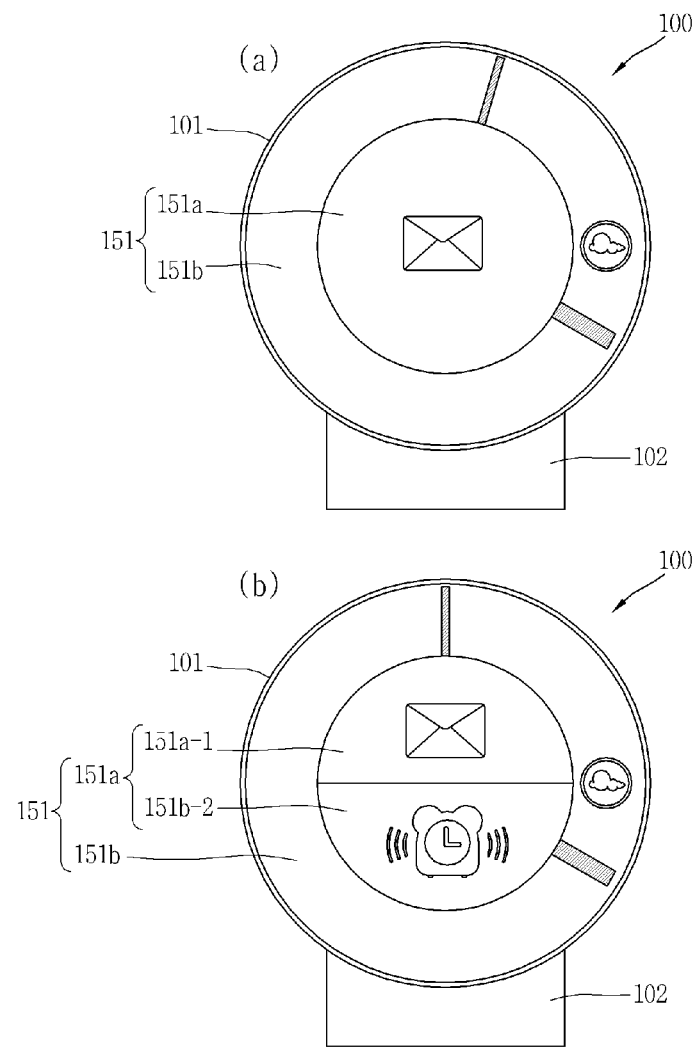

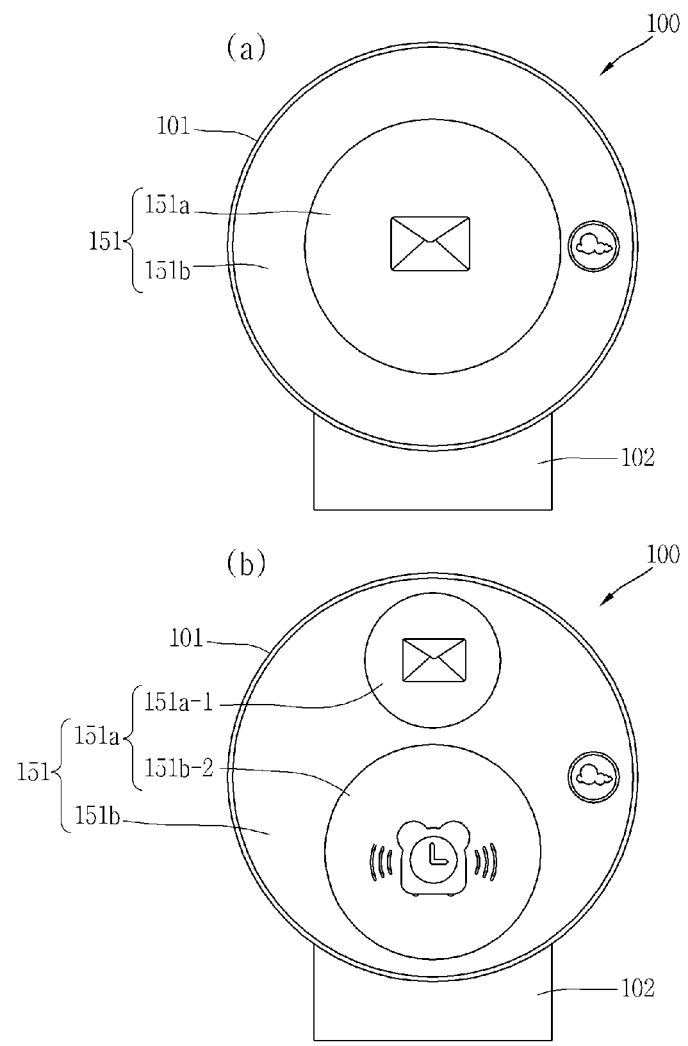
[Fig. 9]

[Fig. 10]
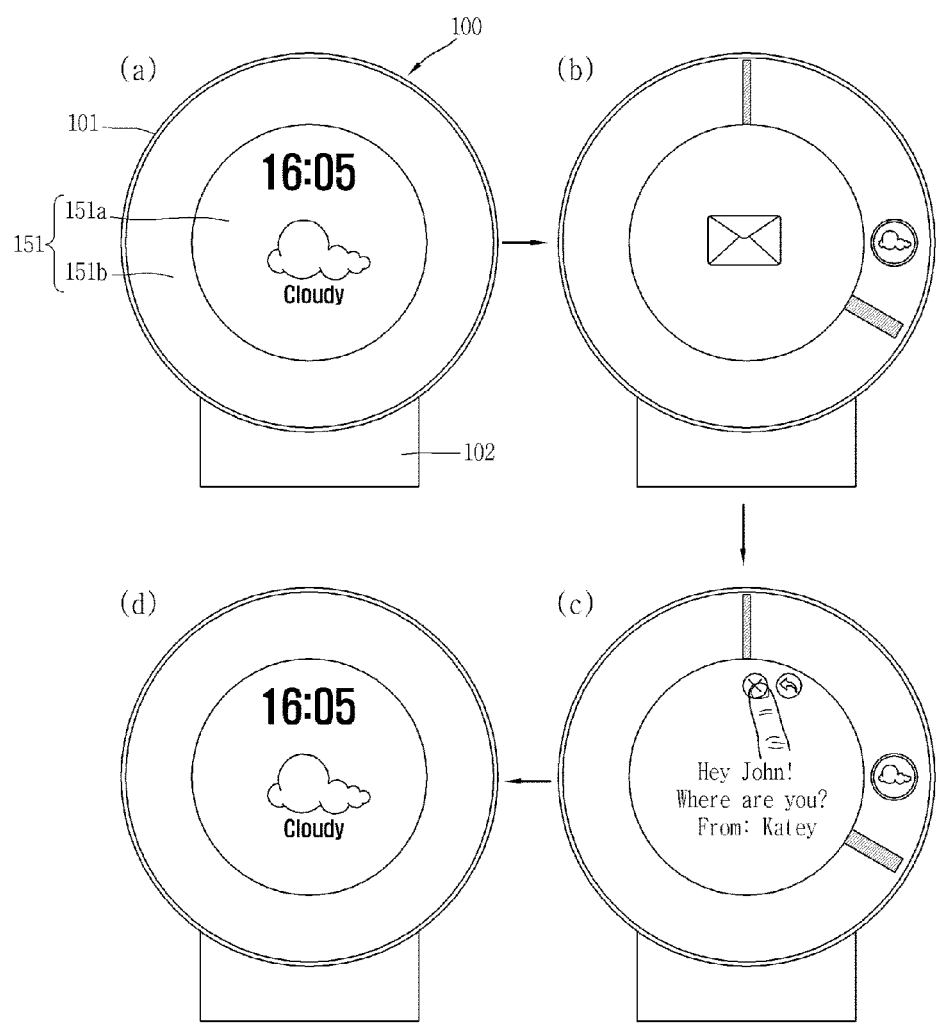

[Fig. 11]
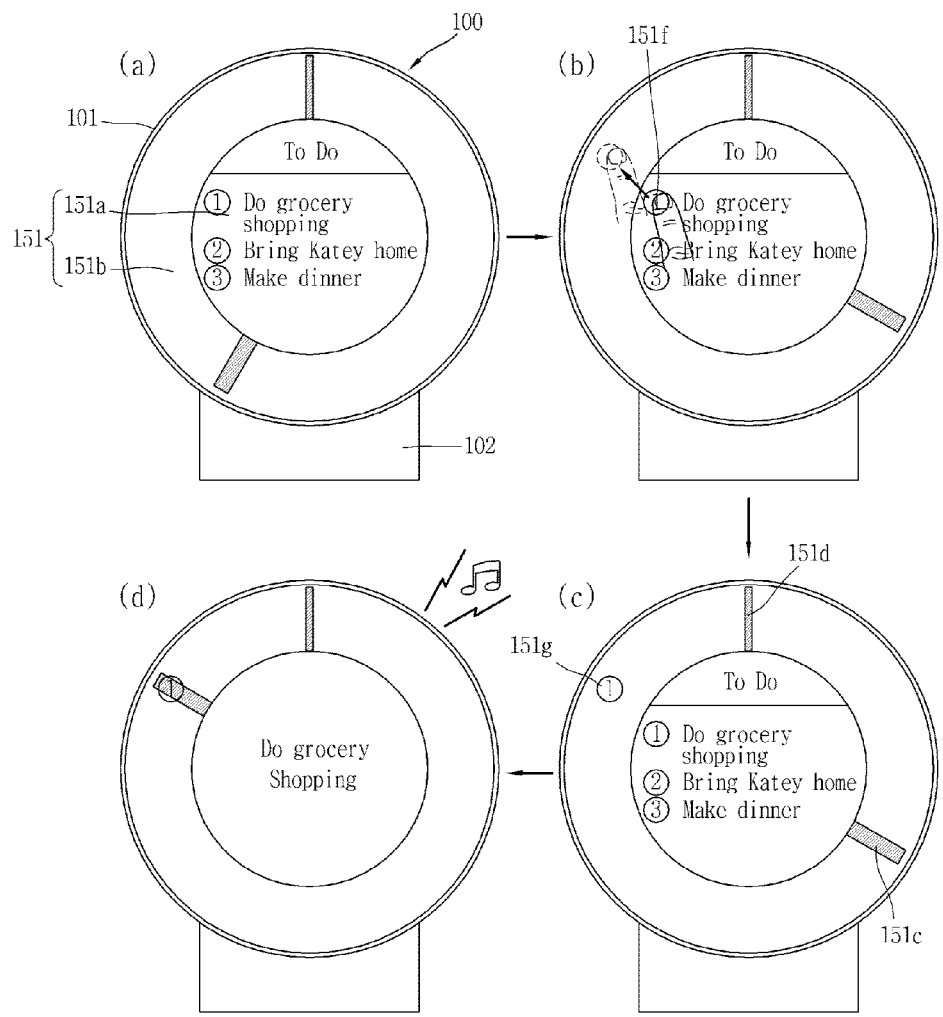

[Fig. 12]
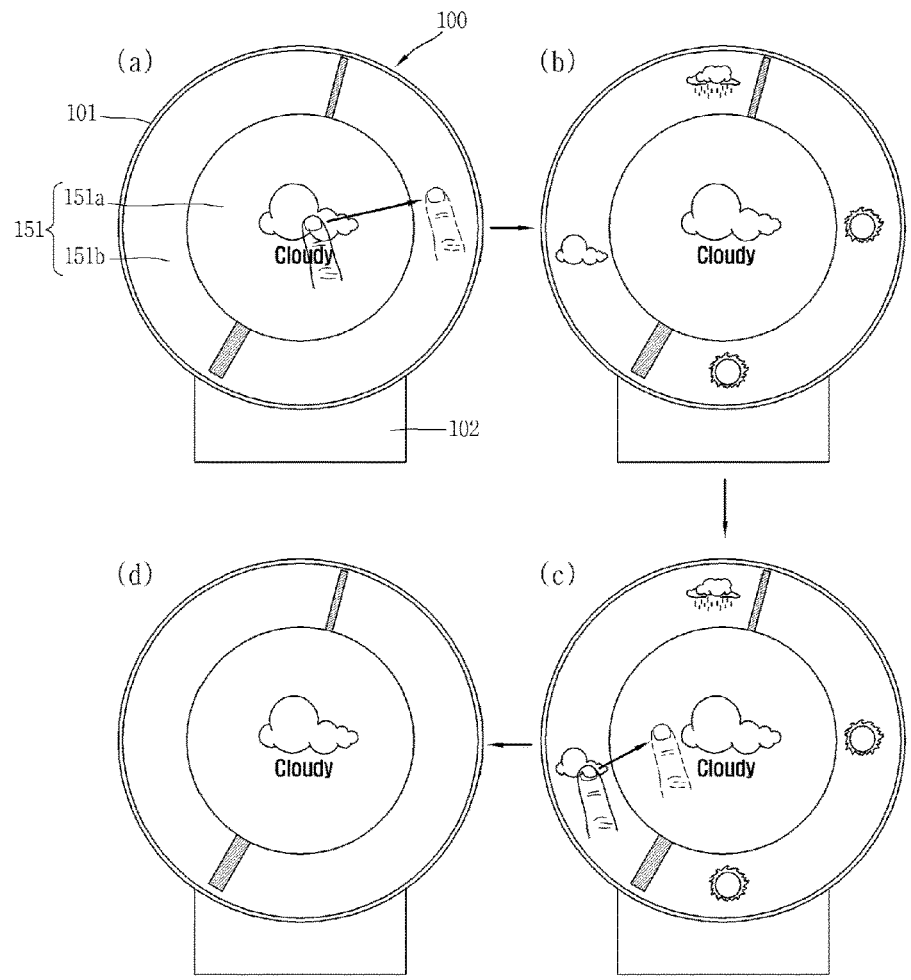
[Fig. 13]
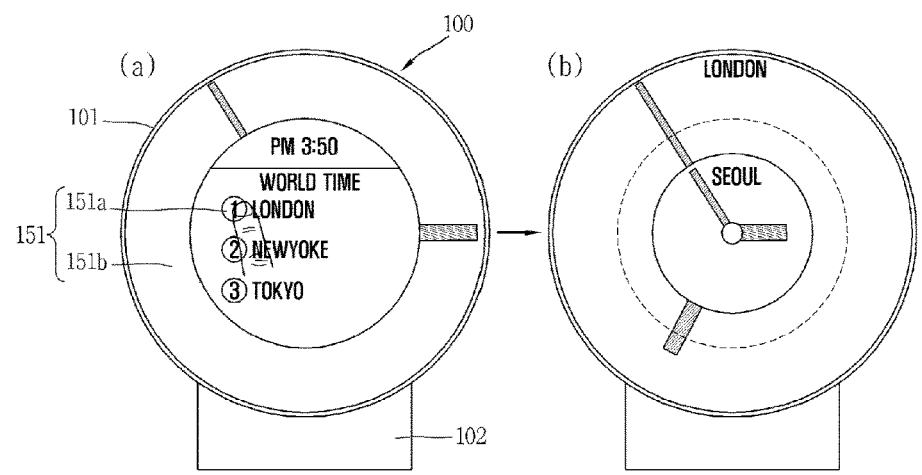

[Fig. 14]
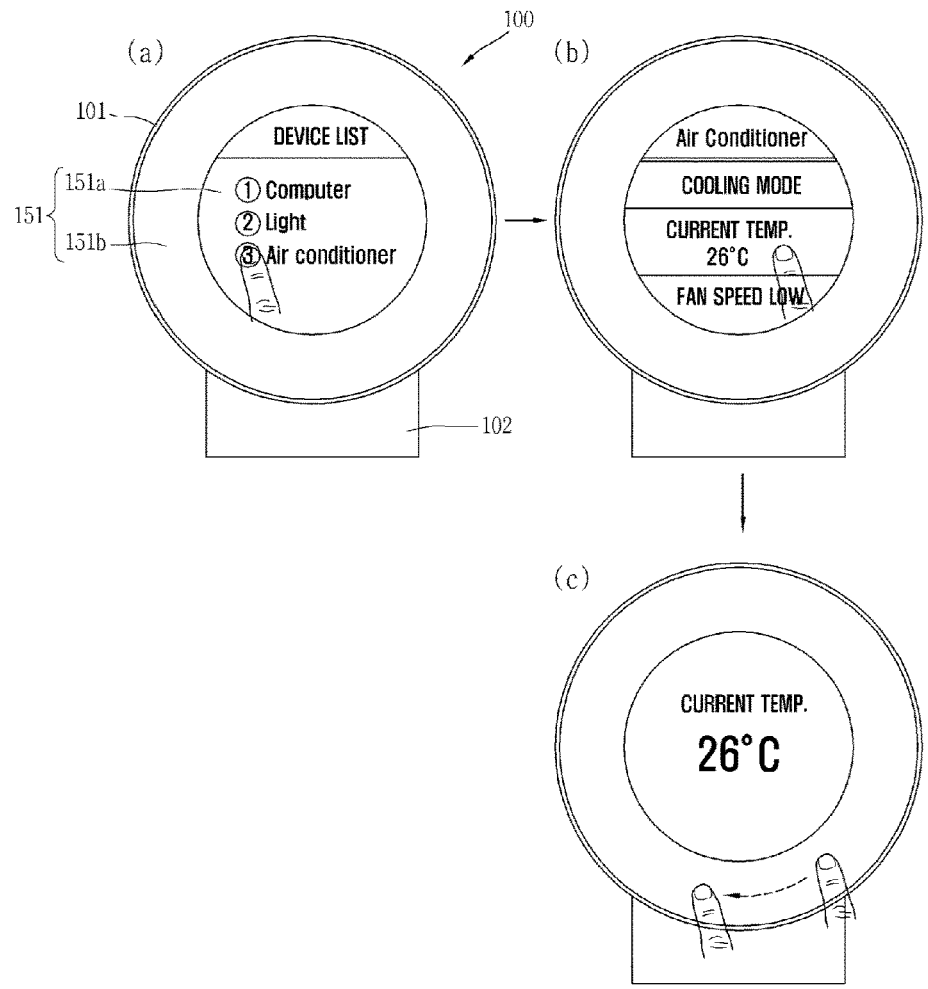
[Fig. 15]
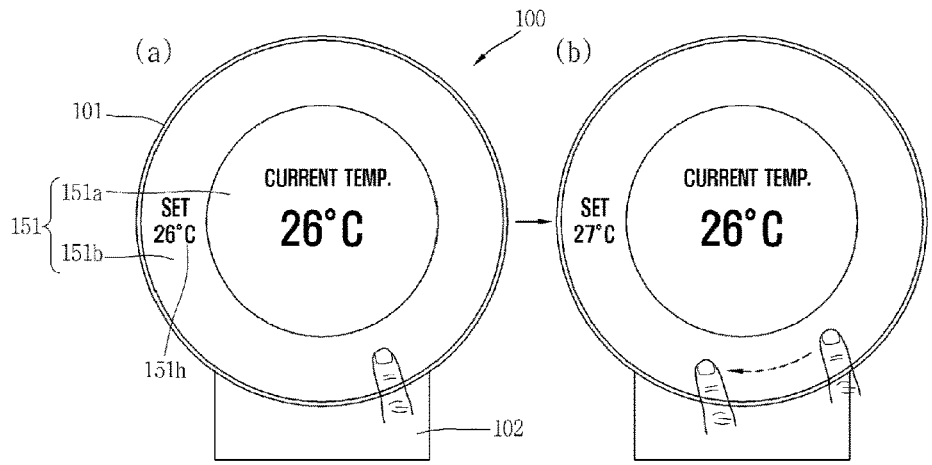

[Fig. 16]
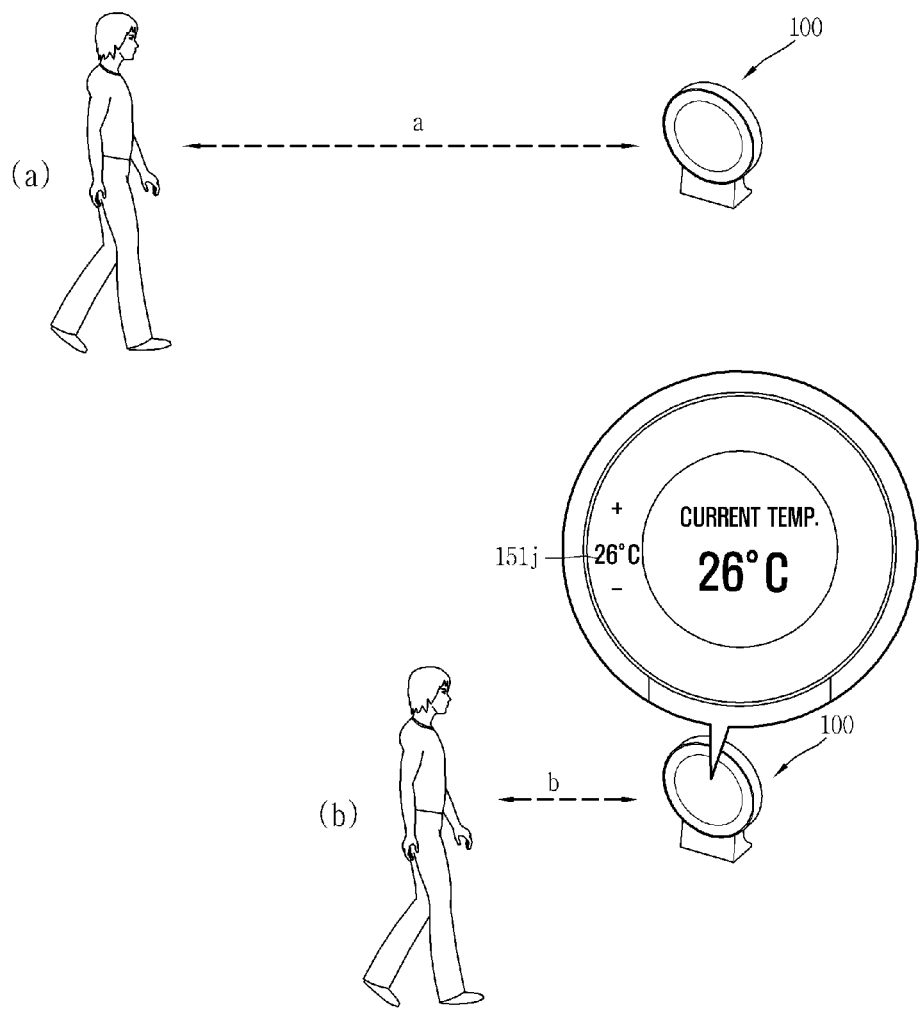

[Fig. 17]
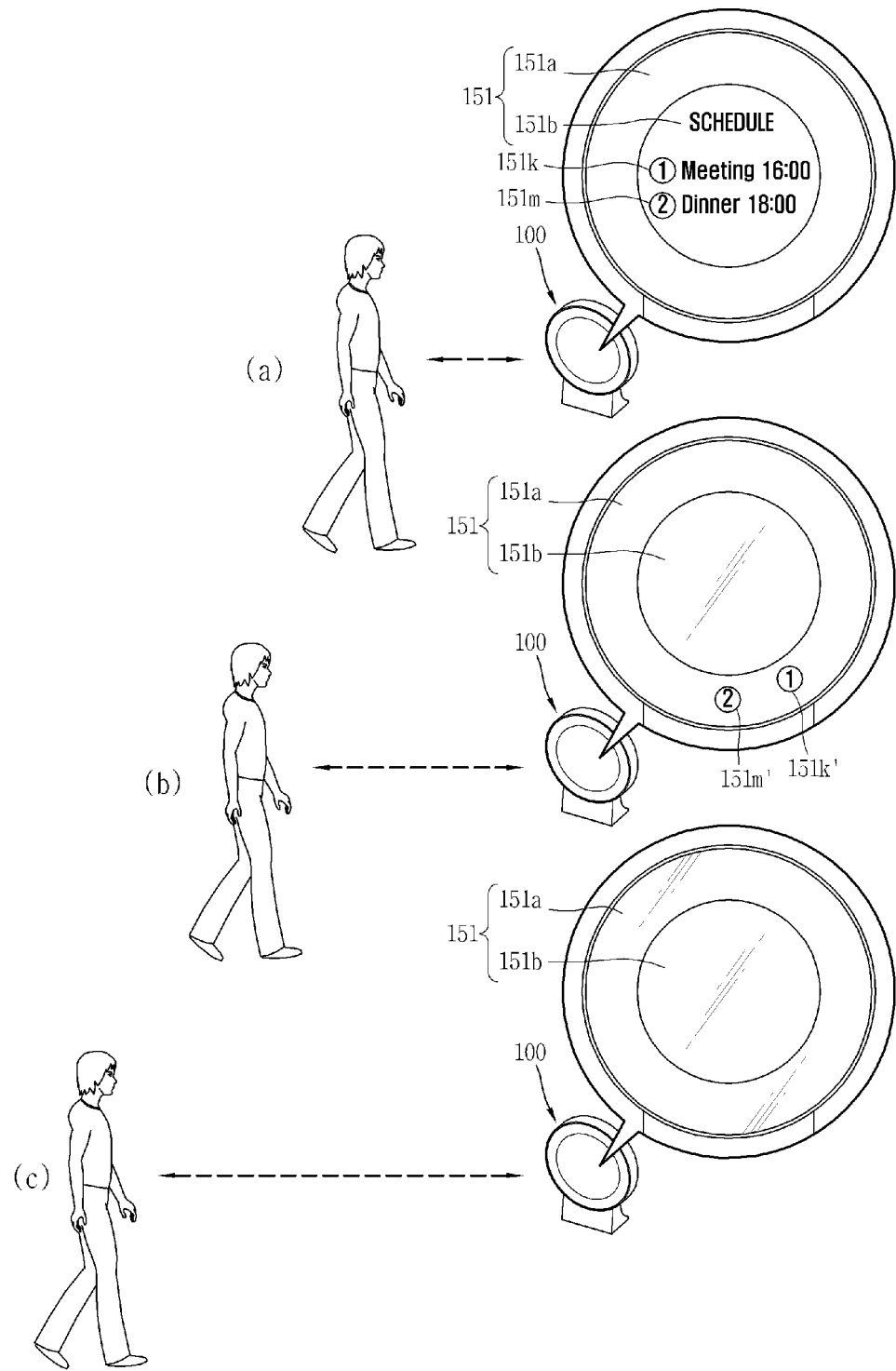

[Fig. 18]
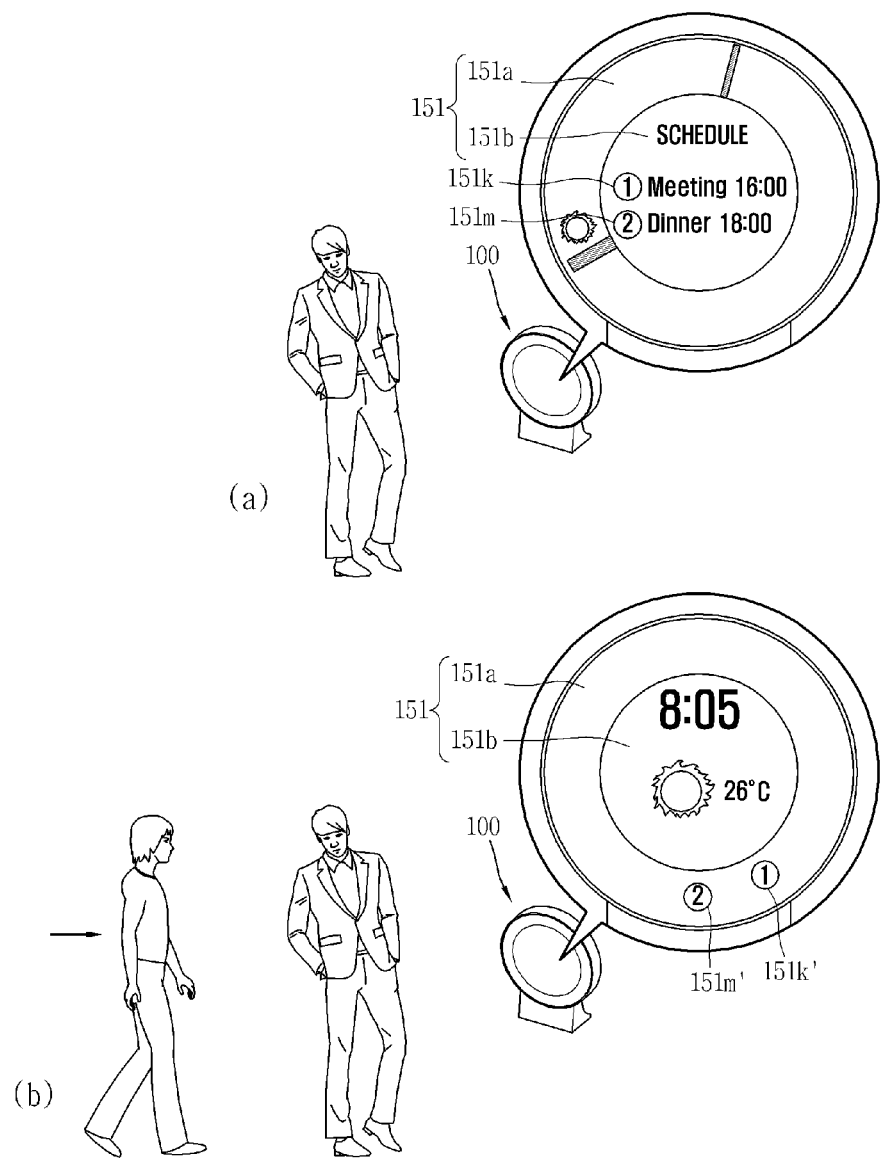

ELECTRONIC DEVICE

CROSS REFERENCE TO RELATED APPLICATIONS

This application is the National Phase of PCT International Application No. PCT/KR2013/011203, filed on Dec. 5, 2013, which claims priority under 35 U.S.C. 119(a) to Patent Application No. 10-2013-0089160, filed in The Republic of Korea on Jul. 26, 2013, all of which are hereby expressly incorporated by reference into the present application.

TECHNICAL FIELD

The present invention relates to an electronic device equipped with a display unit.

BACKGROUND ART

An electronic device is broadly categorized by mobility into a mobile electronic device (mobile terminal) and a stationary electronic device (stationary terminal). The electronic device is further categorized by portability into a handheld terminal and a vehicle-mounted terminal.

In response to an increasing demand for diversified functions, the electronic device has been realized in the form of a multimedia player with multiple functions such as shooting a photographic object as a still image or moving images, reproducing digital audio and video compression files, playing a game, receiving a broadcast or the like. Furthermore, structural and software modifications to the electronic device are considered for supporting and improving functions of the electronic device.

Recent advancements in telecommunication technologies have made it possible to make connections between electronic devices or terminals included in a size-fixed space, such as a home and an office, over a network, and to make use of them. For example, the connection between electronic devices in the home over the network is called a home network, and the electronic devices connected to a central server over the home network is possible to control in the home in which the home network is installed.

DISCLOSURE OF INVENTION

Technical Problem

An object of the present invention is to provide an electronic device capable of outputting information in various ways.

Solution to Problem

To achieve these and other advantages and in accordance with the purpose of the present invention, as embodied and broadly described herein, there is provided an electronic device including a display unit that includes a main region and a sub region surrounding the main region, and a controller that, in response to an occurrence of an event, outputs to the sub region a second screen information associated with a first screen information that is output to the main region before the event occurs.

In the electronic device, when the event occurs, information relating to the event may be output to the main region.

In the electronic device, wherein when a different event occurs after the event has occurred, the controller outputs information relating to the different event to the main region, while the information relating to the event is being output to the main region.

In the electronic device, when the outputting of the information relating to the event that is output to the main region is terminated, the first screen information is output back to the main region, based on selection by a user.

In the electronic device, when the first screen information is output back to the main region, the outputting of the second screen information that is being output to the sub region may be terminated.

In the electronic device, when the multiple events sequentially occur, the controller may output the multiple main regions that correspond to the multiple events, respectively.

In the electronic device, the controller may output the second screen information to a specific position within the sub region according to a type of the first screen information.

In the electronic device, when the first screen information is information relating to time, as the time goes by, the controller may change the position within the sub region, to which the second screen information is output.

The electronic device may further include a wireless communication unit that is configured to communicate with at least one different electronic device, in which, if the first screen information is information relating to a status of the different electronic device, in response to a predetermined-type touch on the sub region, the controller may transmit control information relating to control of the different electronic device to the different electronic device through the wireless communication unit and may change the first screen information to information relating to the status of the different electronic device that is changed based on the control information.

In the electronic device, at least one portion of the control information may be displayed on the sub region.

In the electronic device, a visual key for receiving a control command associated with a change in the status of the different electronic device may be output to the sub region.

The electronic device may further include a sensing unit that is configured to detect that a user approaches a main body of the electronic device, in which, when the user approaches the main body of the electronic device in such a manner that a distance between the user and the main body is a predetermined distance or below, the controller may output the visual key.

In the electronic device, when at least one portion of the first screen information is dragged to the sub region, the controller outputs the second screen information to a position to which the at least one portion of the first screen information is dragged.

In the electronic device, the first screen information may include multiple graphic objects, in which the at least one portion of the first screen information may be at least one of the multiple graphic objects, and the second screen information may be information relating to the at least one graphic object.

In the electronic device, when the second screen information is output to the sub region in response to the occurrence of the event, the first screen information may disappear from the main region.

In the electronic device, when the second screen information that is output to the sub region is dragged to the main region in a state where the first screen information disappears from the main region, the first screen information may be output back to the main region.

In the electronic device, the main region may differ in size from the sub region according to a type of the event.

The electronic device may further include a sensing unit that is formed to detect that the user approaches a main body of the electronic device, in which the controller may identify the user whom the sensing unit detects as approaching the main body and may output information relating to the identified user to the main region.

In the electronic device, when a distance between the main body of the electronic device and the user is a reference distance or above, information relating to the identified user, which is output to the main region, may be output to the sub region.

In the electronic device, when the sensing unit detects that a different user, not the identified user, approaches, the outputting of the information relating to the identified user, which is being output to the main region, may be terminated.

According to another aspect of the present invention, there is provided an electronic device includes a window that includes a main region and a loop-shaped sub region surrounding the main region, a display unit that is arranged in a rear surface of the window and is configured in such a manner that screen information is output to the main region and the sub region, and a controller that is configured such that when a change due to an occurrence of an event occurs in a first screen information that is output to the first region, a second screen information is output to the second region.

Advantageous Effects of Invention

When the event occurs, the electronic device according to the present invention outputs the information relating to the event to the main region and outputs to the sub region the information relating to the information that is being output to the main region. Thus, the user can be provided with the information more effectively.

When the approaching user is detected, the electronic device according to the present invention detects who the approaching user is and how close the approaching user comes to the main body and provides the information relating to the identified user. Accordingly, the user can be provided with information tailed to his/her needs.

In addition, the electronic device according to the present invention communicates with at least one different electronic device to transmit and receive the control information and this realizes a home network environment.

BRIEF DESCRIPTION OF DRAWINGS

FIG. 1 is a block diagram illustrating an electronic device according to one embodiment of the present invention.

FIG. 2a and FIG. 2b are diagrams, each illustrating an example of realizing the electronic device according to the present invention.

FIG. 3a to FIG. 3c are diagrams each illustrating an example of displaying information to a display unit of the electronic device according to the present invention.

FIG. 4 is a diagram for describing a control method that is according to a distance between the electronic device and a user.

FIG. 5a to FIG. 5d are diagrams, each illustrating an example in which when a specific user is identified in the electronic device 100 according to the present invention, the information is displayed on the display unit.

FIG. 6 is a flowchart for describing operation of the electronic device according to the present invention.

FIG. 7 to FIG. 13 are diagrams, each illustrating an embodiment associated with the operation of the electronic device described referring to FIG. 3a to FIG. 3c.

FIGS. 14 to 16 are diagrams, each illustrating an example in which another electronic apparatus is controlled through the electronic apparatus 100 according to the present invention.

FIG. 17 and FIG. 18 are diagrams, each for describing an operation that depends on the identification of the user, the extent with which the user approaches a main body of the electronic device), and the identification of a different user in the electronic apparatus according to the present invention.

MODE FOR THE INVENTION

Hereinafter, an electronic device according to the present invention will be explained in more detail with reference to the accompanying drawings. For the sake of brief description with reference to the drawings, the same or equivalent components will be provided with the same reference numbers, and description thereof will not be repeated.

A suffix "module" or "unit" used for constituent elements disclosed in the following description is merely intended for easy description of the specification, and the suffix itself does not give any special meaning or function.

In describing the present invention, if a detailed explanation for a related known function or construction is considered to unnecessarily divert the gist of the present disclosure, such explanation has been omitted but would be understood by those skilled in the art.

The accompanying drawings are used to help easily understood the technical idea of the present invention and it should be understood that the idea of the present disclosure is not limited by the accompanying drawings.

The electronic device according to the present disclosure may include laptop computers, digital broadcasting terminals, Personal Digital Assistants (PDA), Portable Multimedia Players (PMP), navigation systems, slate PCs, tablet PCs, ultra books, etc. However, it may be easily understood by those skilled in the art that the configuration according to the exemplary embodiments of this specification can be applied to stationary terminals such as digital TVs, desktop computers and the like excluding a case of being applicable only to the electronic devices.

FIG. 1 is a block diagram of an electronic device in accordance with one exemplary embodiment.

The electronic device 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the electronic device 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the electronic device 100 and a wireless communication system or between the electronic device 100 and a network within which the electronic device 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless internet module 113 supports wireless Internet access for the electronic device. This module may be internally or externally coupled to the electronic device 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a electronic device. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the electronic device.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a position of the electronic device 100, a user's approaching degree, etc. A signal sensed by the sensing unit 140 may be transferred to the controller 180. Further, the sensing unit 140 can detect whether or not the power supply unit 190 supplies power, whether or not the interface unit 170 is coupled with an external device, etc.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the electronic device 100. For example, when the electronic device 100 is in an event information output mode, the display unit 151 may display an electronic device corresponding to a received event, and a User Interface (UI) or a Graphic User Interface (GUI) associated with received event information.

When the electronic device 100 is in a call mode, the display unit 151 may display a UI or GUI associated with a call.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and e-paper.

When the display unit 151 is implemented as electronic paper, power for displaying information on the display unit 51 can be reduced.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a prescribed part of the display unit 151, or a capacitance occurring from a prescribed part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the electronic device blocked by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the electronic device 100 (e.g., a call signal reception sound, a message reception sound, etc.). The audio output module 152 may include a speaker, a buzzer, and so on. A speaker included in the audio output module 152 may be implemented as a thin film type.

The alarm unit 153 may provide outputs to inform about the occurrence of an event of the electronic device 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The memory 160 may store a program for the processing and control of the controller 180. Alternatively, the memory 160 may temporarily store input/output data (e.g., power usage amount, average power usage amount, electronic device usage pattern, etc.). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the electronic device 100 may operate a web storage which performs the storage function of the memory 160 on the Internet.

The interface unit 170 may generally be implemented to interface the electronic device with external devices. The interface unit 170 may allow a data reception from an external device, a power delivery to each component in the electronic device 100, or a data transmission from the electronic device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the electronic device 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the electronic device 100 via a port.

Also, the interface unit 170 may serve as a path for power to be supplied from an external cradle to the electronic device 100 when the electronic device 100 is connected to the external cradle or as a path for transferring various command signals inputted from the cradle by a user to the electronic device 100. Such various command signals or power inputted from the cradle may operate as signals for recognizing that the electronic device 100 has accurately been mounted to the cradle.

The controller 180 typically controls the overall operations of the electronic device 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

A shape of an electronic device 100 illustrated in FIG. 1, according to the present invention is described in detail below referring to the accompanying drawings.

FIG. 2a and FIG. 2b are diagrams, each illustrating an example of realizing the electronic device according to the present invention.

The electronic device 100 according to the present invention is arranged in various places, such as a home, an office, and a store. The electronic device 100 is practically used for various purposes according to a place where the electronic device 100 is arranged and is placed in various locations according to a user's reference.

For example, if the electronic device 100 is arranged in a home, the electronic device 100 helps a family member manage his/her daily jobs. As one example, the electronic device 100 manages a schedule for the family member or provides useful information for daily life, such as time information, a weather report, and a traffic report.

On the other hand, if the electronic device 100 is arranged in the office, the electronic device 100 provides the user with advancements in job efficiency. For example, the electronic device 100 arranged in the office provides the user with a task schedule.

The electronic device 100 comes in various shapes. The electronic device 100 is configured to take on a circular shape, as illustrated in FIG. 2a, or is configured to take on a square shape, as illustrated in FIG. 2b.

The electronic device 100 is equipped with the display unit 151 to which visual information on is output. The display unit 151 includes a main region 151a and a sub region 151b surrounding the main region 151a and the visual information is output to both the main region 151a and the sub region 151b. According to the present embodiment, the display unit 151 is configured in software such that it divides into the main region 151a and the sub region 151b.

Alternatively, the display unit 151 may be configured in hardware such that it divides into the main region 151a and the sub region 151b. For example, the sub region 151b may be configured to be a loop-shaped bezel region surrounding the main region 151a. The bezel region is seen as different in color from the main region 151a with the user's unaided eyes.

The main region 151a and the sub region 151b are configured such that they can be driven independently of each other. For example, the main region 151a and the sub region 151b are freely switched between an activated (ON) state and an inactivated (OFF) state. When one of the main region 151a and the sub region 151b is in the ON state, the other is in the OFF state.

The shape of the display unit 151 is configured to be the same as or similar to an external shape of the electronic device 100. Even though the shape of the display unit 151 is not the same or similar to the external shape of the electronic device 100, a shape of a portion of the shape of the display 151 that is exposed to the outside is configured to be the same or similar to the external shape of the electronic device 100.

As illustrated in FIG. 2a and FIG. 2b, the electronic device 100 includes a support (or a prop, 102). The user can place the electronic device 100 at a desired place using the support 102. On the other hand, although not illustrated, the electronic device 100 according to the present invention is configured to be wall-mountable. Thus, the electric apparatus 100 is mounted on the wall.

The electronic device 100 according to the present invention is not limited to the shapes described above. It is apparent that the electronic device 100 can take on various shapes.

In the electronic device 100 according to the present invention, information is output to the display unit 151 in various ways. A description of this is provided in more detail below referring to the accompanying drawings.

FIG. 3a to FIG. 3c are diagrams, each illustrating an example of displaying information on the display unit 151 of the electronic device 100 according to the present invention.

Referring to FIG. 3a to FIG. 3c, before an event occurs, first screen information relating to various functions of the electronic device 100 is output to the main region 151a in the ON state. The first screen information includes all types of information that are available for display on the main region 151a. The first screen information includes at least one or more pieces of information, among a piece of time information, a piece of weather information, a piece of status information relating to various electronic device, a piece of schedule information and the like.

For example, as illustrated in FIG. 3A, the time information is output to the main region 151a. In addition, as illustrated in FIG. 3b, if the electronic device 100 is connected to at least one of the other electronic devices (is in a state where communication is available for mutually exchanging information), the status information relating to the other apparatus is output to the main region 151a. Specifically, the electronic device 100 is connected to various household appliances that are installed in the home, and the status information (as one example, an amount of power consumption, desired air-conditioner temperature, and power-on or -off status of rooms). Accordingly, the user can recognize the status of the various household appliances at first glance and additionally control them.

On the other hand, as illustrated in FIG. 3a and FIG. 3b, when the first screen information is output to the main region 151a, the sub region 151b is in the inactivated state. However, the sub region 151 is not necessarily limited to this state. As illustrated in FIG. 3c, when the first screen information is output to the main region 151a, information may be output the sub region 151b as well. For example, the first screen information including the status information on the other apparatus and the weather information is displayed on the main region 151a, and second screen information including the time information is displayed on the sub region 151b. As illustrated, the time information displayed on the sub region 151b is in the shape of an analog watch. A graphic object 151c in the shape of a short thick bar in the drawings indicates an hour hand, and a graphic object 151d in the shape of a long thin bar indicates a minute hand.

FIG. 4 is a diagram for describing a control method that is according to a distance between the electronic device 100 and the user.

Referring to FIG. 4, the electronic device 100 according to the present invention is configured such that if the user approaches the electronic device 100, information relating to the approaching user or specified information is output. In addition, the electronic device 100 according to the present invention is configured such that at least one piece of information among various pieces of visual information and at least one piece of information among various pieces of aural information is output. In addition, the electronic device 100 according to the present invention is configured such that if the user approaches the electronic device 100 that is outputting various pieces of information, the outputting of the information that is being output to the electronic device 100 before the user approaches the electronic device 100 is terminated and information relating to the approaching user is output.

The control method of outputting the information relating to the user who approaches the electronic device 100 is described in more detail below.

As described above, the electronic device 100 includes the sensing unit 140 detects that the user approaches a main body 101 of the electronic device. As one example, the sensing unit 140 detects whether or not the user approaches the main body 101 of the electronic device, using a proximity sensor (not illustrated).

The sensing unit 140 may detect that the user approaches the electronic device 100, using at least one of the A/V input and output unit 120 and the wireless communication unit 110.

For example, if an image corresponding to the user is included in an image that is input through the camera 121, the controller 180 determines that the user approaches the main body 101 of the electronic device. In addition, the controller 180 additionally determines how close the user approaches the main body 101 of the electronic device, by detecting what percentage of the region of the image the image corresponding to the user occupies. By using the result of the determination, the controller 180 determines whether or not the user approaches the main body closely such that the user can substantially use the information that is output in the main body.

In order to detect the approaching user through the camera 121, the camera 121 is always in the activated state or is in the activated state at predetermined time intervals.

In addition, if the controller 180 detects a user's voice through the microphone 122, the controller 180 determines that the user approaches the main body. In this case, the microphone 122 is always in the activated state or in the activated state in the predetermined time intervals in such a manner that it can detect the user's voice.

In addition, the controller 180 determines whether or not the user approaches the main body, depending on whether or not the external device with which the wireless communication unit 110 can communicate is detected. For example, the wireless communication unit 110 communicates with the external device using at least one among communication standards, such as wireless fidelity (Wi-Fi), digital living network alliance DLNA, near field communication (NFC), infrared data association (IrDa), ultra wideband (UWB), ZigBee, Bluetooth (BT), and Wi-Fi Direct. If the external device that is available for communication is detected through the wireless communication unit 110 using at least one among the communication standards, the controller 180 determines that the user approaches the main body. That is, the controller 180 detects whether or not the user carrying the external device (for example, a smart phone) approaches the main body 101 of the electronic device, by detecting the external device through the wireless communication unit 110.

In addition, the controller 180 measures relative strength of a signal between the wireless communication unit 110 and the external device. The controller 180 determines whether or not the user approaches the main body closely such that the user can substantially use the information that is output in the main body.

In this manner, when it is detected that the user approaches the main body 101 of the electronic device, the controller 180 of the electronic device 100 according to the present invention identifies the user who is detected as approaching the main body 101 of the electronic device. That is, the controller 180 determines who the user approaching the main body is. For example, information on the multiple users, for example, identification information on each family member, is stored in the memory 160, the controller 180 identifies who the user who approaches the main body 101 of the electronic device is, using the identification information.

This identification of the user is made using various methods, such as a method employing a face recognition function through the user of the camera 121 and a method employing a fingerprint recognition function. For example, among a piece of facial information, a piece of voice information, and a piece of fingerprint information on the user, at least one piece of information, is stored in the memory 160. The controller 180 determines who the user who currently approaches the main body 101 of the electronic device is, using the pieces of information stored in the memory 160.

In addition, the identification of the user is made using identification information on the external device that is detected through the wireless communication unit 110. For example, a specific user uses his/her own specific external device (for example, a smart phone, a watch phone, and a glasses phone), and the specific external device has its own identification information. Accordingly, user information (for example, a user's name) and an identification number of the user's specific external device (for example, a serial number of the terminal, an access point (AP) number, Bluetooth information, near field communication (NFC) information are stored in advance in the memory 160. The controller 180 identifies the specific user by comparing (referring to) information detected through the wireless communication unit 110 and the information stored in the memory 160.

For example, if the external device equipped with the NFC function is tagged with respect to a peripheral device that is connected to the main body 101 or the electronic device 100 equipped with the NFC function, the controller 180 identifies the tagged external device and the user of the external device.

In addition, in the electronic device 100 according to the present invention, a constituent element that is used to detect the approaching user is different from a constituent element that is used to identify the user. For example, in order to identify who the user is, the controller 180 detects the approaching user through the proximity sensor, then activates the camera 121, receives a user's facial image, and uses a face recognition function.

On the other hand, when the user is identified, the controller 180 outputs the information relating to the user to the display unit 151. At this time, the information is output in a way that differs according to the distance between the main body 101 of the electronic device and the user.

For example, if the distance between the main body 101 of the electronic device and the user, as illustrated in FIG. 4(*a*), is a reference distance "a", and the distance between the main body 101 of the electronic device and the user, as illustrated in FIG. 4(*b*), is a reference distance "b" that is shorter than the reference distance "a", the controller 180 performs control in such a manner that the way in which the information is output in the case of the distance "a" differs from the way in which the information is output in case of the distance "b".

For example, if the user is positioned at the distance "a", the controller 180 outputs the information relating to the user using an aural way. If the user is positioned at the distance "b", the controller 180 outputs the information relating to the user using at least one of the visual way and the aural way.

That is, if the distance between the main body 101 of the electronic device and the user is a reference distance or above, the controller 180 outputs the information relating to the user using the speaker. If the distance between the main body 101 of the electronic device and the user is below the reference distance, the controller 180 outputs the information relating to the user using at least one of the speaker and the display unit 151.

In addition, if the user is positioned at the reference distance "a", the controller 180 outputs aural information as a sound at a level 3. If the user is positioned at the reference distance "b", the controller 180 outputs the aural information as a sound at a level 1.

In addition, if the user is positioned at the reference distance "a", the controller 180 outputs text (characters) in such a manner that the text is larger in size than when the user is positioned at the reference distance "b". That is, the information that is output to the display unit 151 differs according to the distance between the main body 101 of the electronic device and the user.

In addition, when the distance between the main body 101 of the electronic device and the user changes as the user approaches the main body 101 of the electronic device, the controller 180 outputs the information in a proper way according to the changing distance. For example, if the distance between the main body 101 of the electronic device and the user changes from the reference distance "a", to the reference distance "b", the controller 180 terminates the outputting of the aural information and outputs the visual information. That is, if the user moves a distance such that the distance between the main body 101 of the electronic device and the user changes from the reference distance or above to below the reference distance, the information that is output through the speaker is output through the display unit 151 or is output through both of the speaker and the display unit 151.

The distance between the main body 101 of the electronic device and the user described above is measured in various ways. For example, the distance between the main body 101 of the electronic device and the user is measured using at least one of the camera 121, the microphone 122, the proximity sensor, and the wireless communication unit 110.

The information relating to the user that is output as the result of identifying the user is information that is stored in the memory 160 of the electronic device 100 or information that is received from the user's mobile terminal (for example, the smart phone) of the user or from a cloud server.

For example, the controller 180 stores the information relating to the user in the memory 160 and when the user is identified, outputs the stored information relating to the user. The information relating to the user is information that is stored by the identified user or information that is stored by another user.

For example, if the identified user is defined as a first user, a second user who is not the first user may have information that he/she desires to let the first user know. In this case, the second user stores in the memory 160 the information that he/she will let the first user know, and when the first user approaches the main body, applies a control command (for example, which is generated through a voice command or a touch operation) to the electronic device 100 in such a manner as to output the information. Then, corresponding to the control command, the controller 180 controls the electronic device 100 in such a manner that the information received from the second user is output to the first user. As one example, if a configuration is provided such that the user can be recognized through face recognition, when information of which the outputting is reserved by the second user different from the first user is present, in response to the reception of the facial image of the user through the camera 121, the controller 180 controls an outputting unit 150 in such a manner that the reserved information is output.

As another example, corresponding to the user being identified, the controller 180 receives the information relating to the user from the mobile terminal of the identified user. The information relating to the user includes at least one piece of information, among a piece of event information that is generated in the mobile terminal, the piece of event information that is generated in the mobile terminal but not checked by the user, a piece of information that corresponds to a predetermined importance level, a piece of information relating to a predetermined application that is installed in the mobile terminal, and a piece of information that is selected for outputting in the electronic device by the user. That is, there are many types of information that are transmitted from the mobile terminal to the electronic device 100.

Even though the mobile terminal is not positioned in the vicinity of the main body 101 of the electronic device, the controller 180 receives information from the mobile terminal and thus outputs the received information through the outputting unit 150. Accordingly, a configuration is provided such that even though the electronic device 100 is positioned in a first space and the user's mobile terminal is positioned in a second space that is separated from the first space, the information relating to the mobile terminal can be received through the electronic device 100. Accordingly, even though the user does not carry the mobile terminal, he/she can use the information relating to his/her mobile terminal through the electronic device 100.

In addition, the controller 180 outputs together information received from at least one different user's mobile terminal, not the current user's mobile terminal, according to a type of information that is output.

For example, the controller 180 receives the pieces of schedule information on the family members, the pieces of information on the family members that have to be shared between the family members, from the mobile terminals of different users who correspond to the family members, and outputs the pieces of schedule information along with the piece of schedule information on the identified user.

In order to help understand the disclosure above, a description is provided in detail below referring to the accompanying drawings.

FIG. 5a to FIG. 5d are diagrams, each illustrating an example in which when a specific user is identified in the electronic device 100 according to the present invention, the information is displayed on the display unit 151.

Referring to FIG. 5a, if it is detected that the user approaches the main body 101 of the electronic device and that user is identified, the controller 180 output the information relating to the identified user.

At this time, as described above, the controller 180 outputs the information relating to the user in ways that differ depending on the distance between the main body 101 of the electronic device and the user. For example, as described above referring FIG. 4(a), if the distance between the main body 101 of the electronic device and the user deviates from the reference distance (for example, the distance between the user and the main body is "a"), the controller 180 outputs the information so greatly that the user can identify the visual information from a distance away. As one example, the information relating to the identified user is information relating to the message and the distance between the main body 101 of the electronic device and the user is the reference distance or above, the controller 180 greatly outputs only a graphic object 151e indicating that a message to be checked is present.

In addition, for the user who is positioned out of the reference distance, the controller 180 outputs the information on the message through the voice. Accordingly, the user is provided with the information from the electronic device 100 through the sound.

In addition, if the distance between the user and the main body is the reference distance or below (for example, if the distance between the user and the main body is "b", as illustrated in FIG. 4(b)), the controller 180 outputs content of the message immediately, instead of displaying a graphic object indicating the message being received. On the other hand, if the user approaches closer and closer to the main body 101 of the electronic device, the controller 180 performs the control in such a manner that when the distance between the main body 101 of the electronic device and the user is the reference distance or above, only the graphic object indicating the presence of the message is output. However, the controller 180 performs the control in such a manner that when the user comes within the reference distance, the content of the message is immediately output.

If the distance between the main body 101 of the electronic device and the user is the reference distance or above, as illustrated in FIG. 5c, the controller 180 executes a voice-related function (for example, a voice recognition function, a voice outputting function or the like) so that the user can control the electronic device 100 fast and easily. The voice outputting function here is used in outputting the information relating to the user. In addition, the controller 180 controls the audio output unit 152 in such a manner that voice volume differ depending on the distance between the user and the main body 101 of the electronic device.

In addition, the controller 180 generates a control signal for controlling the electronic device 100 using the user's voice that is input through the microphone 122. The control signal is configured such that it is transmitted to at least one different electronic device that is connected to the electronic device 100 through the wireless communication unit 110. In this case, at least one different electronic device is controlled based on the user's voice.

On the other hand, if it is detected that the user approaches the main body, and thus the user is positioned out of the reference distance, the controller 180 activates a wake-up mode in which the microphone 122 waits for the user's voice to be input. For example, if the microphone 122 is always activated, there occurs a problem that even though the voice is not a voice for controlling the electronic device 100, the controller 180 recognizes that voice as the voice for controlling the electronic device 100. Accordingly, the microphone 122 is activated (or the wake-up mode is activated) only when a setting is provided in advance. The setting is provided in advance, as described above, is when the approaching user is detected or when the approaching user is detected and the distance between the user and the main body 101 of the electronic device is the reference distance or above.

In this manner, after the wake-up mode for the microphone 122 is activated, if a voice is not input into the microphone 122 for a predetermined time, the wake-up mode for the microphone 122 is inactivated. That is, if the wake-up mode for the microphone 122 is inactivated, even though the user inputs his/her voice into the electronic device 100, the controller 180 does not recognize this input as the control command for controlling the electronic device 100. In this case, the user activates back the wake-up mode for the microphone 122 by performing a separate operation on the electronic device 100.

On the other hand, if a voice is input through the microphone 122, the controller 180 analyzes the voice that is input and generates the control command that corresponds to the analyzed voice.

As one example, the controller 180 converts into text the voice that is input, using a speech-to-text technology. Then, the text that results from the conversion is compared with the control command stored in the memory 160, and thus the control command that corresponds to the text that results from the conversion is selected.

As another example, using a natural language processing technology, the controller 180 understand a language corresponding to the voice that is input and generates the control command that corresponds to the understood language. That is, the controller 180 analyzes the meaning of the voice that is input, and generates the control command that corresponds to the analyzed meaning.

On the other hand, the control command described above is transmitted to at least one different electronic device in the form of the control signal through wireless communication.

It is apparent that even though the distance between the main body 101 of the electronic device and the user is the reference distance or below, the voice recognition function is executed.

On the other hand, while the user is out of reference distance with respect to the main body 101 of the electronic device and thus the control command is being received through the voice, when the user moves within the reference distance with respect to the main body, at least one visual key is output to the display unit 151 in such a manner that the control command is received through a user's touch. In addition, even though the user moves such that the distance between the main body 101 of the electronic device and the user changes from the reference distance or above to below the reference distance, the controller 180 continuously executes a function that corresponds to a user's voice control command that is input through the micro. That is, if the voice recognition function is activated and then the user moves within the reference distance with respect to the main body, the controller 180 continuously maintains an activated state of the voice recognition function.

As illustrated in FIG. 5d, the controller 180 outputs related information, based on an identified user's life pattern stored in the memory 160 and current time. For example, if current time corresponds to morning rush hour, the controller 180 outputs information relating to a means of transportation that is frequently used by the identified user.

On the other hand, if the information relating to the approaching user is not present (that is, if the user is not identified) or if the information that has to be output in relation to the identified user is not available, the controller 180 outputs pertinent information according to the existing conditions.

As described above, when the approaching user is detected, the electronic device 100 according to the present invention detects who the approaching user is and how close the approaching user comes to the main body and provides the information relating to the identified user. Accordingly, the user can be provided with information tailed to his/her needs.

An embodiment associated with the information that is displayed on the main region 151a and the sub region 151b using the various control methods described above is described in detail below.

FIG. 6 is a flowchart for describing operation of the electronic device 100 according to the present invention. FIG. 7 to FIG. 13 are diagrams, each illustrating an embodiment associated with the operation of the electronic device 100 described referring to FIG. 3a to FIG. 3c.

Referring to FIG. 6 and FIG. 7, the first screen information is output to the main region 151a that is in an ON state (S310). The first screen information, as described above, includes the visual information relating to the various functions of the electronic device 100. FIG. 7 illustrates that the first screen information including current time and a current weather report is output to the main region 151a.

If an event occurs in a state where the first screen information is output to the main region 151a (S320), in response to the occurrence of the event, the controller 180 outputs to the sub region 151b the second screen information associated with the first screen information that is output to the main region 151a before the event occurs (S330).

The event includes all possible changes in the electronic device 100, such as a touch on the display unit 151, a reception of a signal through the wireless communication unit 110, the detection of the approaching user by the sensing unit 140, and elapsing of a predetermined period of time. In addition, the event occurs if information is received from the external device (for example, a user's mobile phone or smart phone) connected to the electronic device. For example, if a message is received from the external device, the external device transmits message information on the received message to the electronic device. Accordingly, the user can check the message received from the external device, through the electronic device according to the present invention.

On the other hand, the second screen information is the same in property as the first screen information, but is information that is visually transformed. For example, if the first screen information is in the shape of a digital watch that indicates current time numerically, the second screen information is in the shape of an analog watch that indicates the current time with an hour hand and a minute hand. That is, the second screen information is the same in content as the first screen information, but is different in display form from the first screen information. In addition, the second screen information is in the shape of the summarized first screen information. As one example, if the first screen information indicates energy-related information in detail, such as the status of the various electronic devices 100 being used and power consumption, the second screen information is configured such that it indicates the power consumption in a simple manner.

On the other hand, if an event occurs, information relating to the event is output to the main region 151a. The event-related information is output to the main region 151a, and almost at the same time the second screen information is output to the sub region 151b.

The controller 180 outputs the second screen information to a specific position within the sub region 151b according to a type of the first screen information. FIG. 7 illustrates that if the message is received through the wireless communication unit 110 (the occurrence of the event), the first screen information including current-time information in the shape of a digital watch and the current weather report that are output to the main region 151a is output in the shape of the transformed second screen information to the sub region 151b. Specifically, the second screen information includes the current-time information that is output in the shape of an analog watch and the current weather report that is displayed in a simple manner.

If the first screen information is information relating to time, as the time goes by, the controller 180 changes a position within the sub region 151b, to which the second screen information is output. The current-time information that is displayed on the sub region 151b is configured such that positions of the hour hand and the minute hand change as time goes by. The current weather information is set such that it is displayed adjacent to the hour hand.

On the other hand, the information relating to the message (the information relating to the event) is output to the main region 151a. For example, as illustrated, the information relating to the event is configured such that it is output in the shape of an icon and detailed information is output with the control signal that occurs thereafter it is output in the shape of the icon or such that it is output in the shape of the icon the detailed information is output immediately.

In the control method described above, if an event occurs, not only the information relating to the event but also the information before the event occurs is output to the display unit 151. Thus, the user can be provided with the information more effectively.

Referring to FIG. 8, when an event occurs and then a different event occurs, the controller 180 is configured such that information relating to the different event is output to the main region 151a in a state where information relating to the event is output.

At this time, the main region 151a is divided into multiple regions 151a-1 and 151a-2. The information relating to the event and the information relating to the different event are output to the multiple regions 151a-1 and 151a-2, respectively. FIG. 8 illustrates that in a state where a message is received (an event occurs), information relating to the received message is output to the main region 151a, and the current-time information and the current weather report that are output to the main region 151a are transformed and are displayed on the sub region 151b, when an alarm goes off (another event occurs), the main region 151a are divided into two regions 151a-1 and 151a-2 to which a message reception icon and an alarm icon are output, respectively.

The size of the message icon that is output to the main region 151a becomes smaller than when the message icon alone is output to the main region 151a in such a manner that the user can intuitively recognize an event that recently occurs. The icon that indicates the alarm, the event that recently occurs, is output in such a manner that the icon is larger in size than the message icon. In addition, the regions 151a-1 and 151a-2 that result from dividing the main region 151a are adjusted in size to provide this effect.

On the other hand, a configuration is provided such that when an event occurs and then a different event occurs, information relating to the event that is output to the main region 151a is moved to the sub region 151b and is output and only information relating to the different event is output to the main region 151a. If events sequentially occur, whether information relating to the events that is output to the main region 151a is made to remain in the main region 151a or is moved to the sub region 151b and is output changes depending on a user's setting. For example, if an event occurs and then a different occurs within a predetermined time, the events are separately displayed on the main region 151a. Alternatively, the event is set in such a manner that it is moved to the sub region 151b and is output.

In addition, as illustrated in FIG. 9, if the multiple events sequentially occur, the controller 180 performs the control in such a manner that the multiple regions 151a-1 and 151a-2 that correspond to the multiple events, respectively, are output. FIG. 9 illustrates that if a message is received and then an alarm goes off, a different main region 151a-2 to which information relating to the alarm is output, which is the same in shape as or similar in shape to the main region 151a-1 to which information relating to the message is output, is further output.

At this time, as the main region 151a-1 contains the information that has occurred more recently, the mains region 151a-1 is output with the size thereof becoming larger. Accordingly, the user can recognize order in which the events have occurred, based on the sizes of the main regions 151a-1 and 151a-2.

Referring to FIG. 10, when the outputting of the information relating to the event that is output to the main region 151a is terminated, the first screen information is output back to the main region 151a. At this time, when the first screen information is output back to the main region 151a, the outputting of the second screen information that is being output to the sub region 151b is terminated.

For example, as illustrated in FIG. 10(a), the first screen information including and the current-time information and the current weather report is displayed on the main region 151a before an event occurs. As illustrated in FIG. 10(b), when a message is received through the wireless communication unit 110 (an event occurs), at least one portion of the first screen information is transformed into the second screen information and is moved to the sub region 151b, and information relating to the message is output to the main region 151a.

As illustrated in FIGS. 10(c) and 10(d), when the outputting of the information relating to the message is terminated based on the selection by the user, the information relating to the message disappears from the main region 151a, at least one portion of the second screen information that is output to the sub region 151b is transformed back into the first screen information and is moved to the main region 151a and is output. As a result, the second screen information that is output to the sub region 151b disappears.

Referring to FIG. 11, when at least one portion of the first screen information is dragged to the sub region 151b, the controller 180 performs the control in such a manner that the second screen information is output to a position to which the at least one portion of the first screen information is dragged. At this time, the first screen information includes multiple graphic objects, the at least one portion of the first screen information is at least one of the multiple graphic objects, and the second screen information is information relating to the at least one graphic object.

As illustrated in FIG. 11(a), a to-do list, the first screen information, is displayed on the main region 151a. The multiple graphic objects are detailed items in the to-do list. As illustrated in FIGS. 11(b) and 11(c), when in a state where an analog watch is displayed on the sub region 151b, the user selects at least one of the detailed items "at least one graphic object 151f" and drags the selected graphic object to a position that corresponds to specific time indicated in the analog watch, the second screen information relating to the selected item is displayed as an icon 151g.

At this time, a new event occurs according to a conjunction relationship established between the information displayed on the sub region 151b and the second information that newly occurs. For example, as illustrated in FIG. 11(d), when the graphic object 151c indicating an hour hand overlaps a corresponding icon 151g, an alarm unit 153 generates an alarm signaling that the corresponding item should be done. The alarm is output to the main region 151a. A configuration may be provided such that sound is output through the audio output module 152.

Referring to FIG. 12, when at least one portion of the first screen information is dragged to the sub region 151b, the controller 180 performs the control in such a manner that the second screen information is output to a specific position within the sub region 151b according to a type of the first screen information. At this time, the first screen information remains output to the main region 151a.

When a graphic object for weather that is output to the main region 151a, as illustrated in FIG. 12(a), is dragged to the sub region 151b in a state where the current weather report is output to the main region 151a and the current time is output in the shape of an analog watch to the sub region 151b, a weather forecast, illustrated in FIG. 12(b), is output according to specific hours in conjunction with the analog watch. At this time, the current weather information is continuously output to the main region 151a. Accordingly, the user can obtain more detailed information on the first screen information that is output to the main region 151a.

Thereafter, as illustrated in FIGS. 12(c) and 12(d), when the user selects one of the graphic objects that are included in the second screen information that is output to the sub region 151b and drags the selected graphic object to the main region 151a, weather forecast information that is displayed on the sub region 151b disappears.

On the other hand, referring to FIG. 13, the main region 151a and the sub region 151b differ in size according to a type of event. In a general state, because the event and content associated with main information and the like are output to the main region 151a, content associated with sub information is output to the sub region 151b, the sub region 151b is output in such a manner that the sub region 151b is smaller in size than the main region 151a. However, if the information that is output to the main region 151a is equal to the information that is output to the sub region 151b, the size of the sub region 151b is set to be larger than in a general state.

For example, when the user selects a specific city (for example, London) in a state where a list for setting the time anywhere in the world is output to the main region 151a, the current time in the city (for example, Seoul) in which the user is positioned is displayed on the main region 151a and the current time in the specific city is displayed on the sub region 151b. The current time in the city in which the user is positioned and the current time in the specific city are equal information in that they indicate the current time according to cities. Accordingly, the controller 180 increases the size of the sub region 151b in such a manner that the sub region 151b appears similar to the main region 151a.

On the other hand, if the current time is displayed in the analog shape, because morning and afternoon cannot be distinguished, the controller 180 outputs the corresponding regions 151a and 151b in the morning in a brightened manner and outputs the corresponding regions 151a and 151b in the afternoon in a relatively darkened manner. In addition, a configuration is provided such that as time goes by, backgrounds of the corresponding regions 151a and 151b gets brighter and brighter or gets darker and darker.

FIG. 14 to FIG. 16 are diagrams, each illustrating an example in which another electronic device is controlled through the electronic device 100 according to the present invention.

As described above, the wireless communication unit 110 is configured such that it can communicate with at least one different electronic device (external device). For example, if the electronic device 100 is connected to other electronic devices within one given space and thus makes up a home network, the other electronic devices are household appliances that are installed in the home.

As illustrated in FIG. 14(a), in a controlled mode of the external device, a list of controllable external devices is output to the main region 151a. If the user selects a specific electronic device, information (the first screen information) relating to the status of the selected electronic device is output as illustrated in FIG. 14(b). If the information relating to the status includes multiple items, the main region 151a is divided into multiple regions, and the multiple items are output to the multiple regions that result from the division, respectively.

As illustrated in FIG. 14(c), if a predetermined-type touch is applied to the sub region 151b in a state where information relating to the status of the selected electronic device is output to the main region 151a, the controller 180 performs the control in such a manner that control information relating to control of the selected electronic device is transmitted to the selected electronic device through the wireless communication unit 110. At this time, the controller 180 changes the first screen information to information relating to the status of the different electronic device that is changed based on the control information.

As one example, when successive touches are clockwise applied to the sub region 151b in a state where the user selects an air conditioner from the list of external devices and then selects a temperature-related item from among various controllable items, the controller 180 transmits the control information relating to an increase in temperature that is set, to the air conditioner through the wireless communication unit 110. In contrast, when the successive touches are counterclockwise applied to the sub region 151b, the controller 180 transmits the control information relating to a decrease in the temperature that is set, to the air conditioner through the wireless communication unit 110. At this time, the first screen information that is output to the main region 151a is current temperature and is changed based on the control information relating to the increase or decrease in the temperature that is set.

On the other hand, as illustrated in FIG. 15, at least one portion of the control information is displayed on the sub region 151b. In this case, the control of the selected item is performed by applying the touch input to the sub region 151b. In the embodiments described above, when the temperature-related item is selected from among the various controllable items, currently-set temperature 151h is displayed on the sub region 151b. And when the successive touches are counterclockwise applied to the sub region 151b (for example, the drag that is counterclockwise applied), the currently-set temperature 151h gradually increases with the applied touch. In this case, when the drag is applied in the opposite direction, the currently-set temperature gradually increases. That is, the control is differently performed on the selected item according to a touch input direction.

Referring to FIG. 16, a visual key for receiving the control command associated with a change in the status of the different electronic device is output to the sub region 151b. In addition, a configuration is provided such that when the user approaches the main body 101 of the electronic device such that the distance between the user and the main body 101 is the reference distance below, the controller 180 performs the control in such a manner that a visual key 151j is output. In this case, the controller 180 displays the list of controllable external devices differently or limits some of the controllable items, depending on whether the presence or absence of the user's authority that is stored in the memory 160.

As illustrated, the visual key 151j is a key that controls the information that is output to the main region by applying the touch input. For example, the increase or decrease in the currently-set temperature that is displayed on the main region is adjusted by the visual key 151j.

FIG. 17 and FIG. 18 are diagrams, each for describing an operation that depends on the identification of the user, the extent with which the user approaches the main body 101 of the electronic device, and the identification of the different user in the electronic device 100 according to the present invention.

Referring to FIG. 17(a), as described above, the controller 180 is configured in such a manner as to identify the approaching user which is detected by the sensing unit 140 and outputs the information relating to the identified user to the main region 151a. FIG. 17(a) illustrates that the first screen information including schedule items 151k and 151m associated with the identified user who approaches the main body 101 of the electronic device such that the distance between the user and the main body 101 is the reference distance or below is output to the main region 151a.

Thereafter, as illustrated in FIG. 17(b), a configuration is provided such that when the distance between the main body 101 of the electronic device and the user is greater than the reference distance (the event occurs), the first screen information relating to the identified user, which is output to the main region 151a, is output as the pieces 151k' and 151m' of second screen information to the sub region 151b. At this time, the first screen information disappears from the main screen. When the user approaches the main body 101 of the electronic device such that the distance between the user and the main body 101 is the reference distance or below, the second screen information that is output to the sub region 151b is output, as the first screen information, back to the main region 151a.

As illustrated in FIG. 17(c), when the user moves far away from the main body 101 of the electronic device and thus the sensing unit 140 is in a state where it cannot detect the user, the second screen information disappears from the sub region 151b. That is, the display unit 151 is in the inactivated OFF state.

On the other hand, referring to FIG. 18, when the sensing unit 140 detects another user who approaches, not the identified user, the information relating to the identified user, which is output to the main region 151a, is output to the sub region 151b. Accordingly, the privacy of the identified user is protected.

As illustrated in FIG. 18(a), when while the user checks the first screen information including the schedule items 151k and 151m that are output to the main region 151a, a different user approaches, the controller 180 detects the different user through the sensing unit 140 and briefly displays the first information that is output to the main region 151a, as the pieces 151k' and 151m of second screen information, to the sub region 151b. In addition, when the different user approaches, the outputting of the information relating to the identified user, which is output to the main region 151a is terminated.

The control method described in the present specification is realized as processor-readable codes on a program-recorded medium.

A ROM, a RAM, a CD-ROM, a magnetic tape, a floppy disk, an optical data storage device and the like are examples of the medium, and the medium may be realized in the form of a carrier wave (for example, a transmission over the Internet).

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

The preferred embodiments of the present invention provide an electronic device capable of outputting information in various manners, which can be applied to various industrial fields.

The invention claimed is:
1. An electronic device comprising:
a display unit that includes a main region and a sub region surrounding the main region; and
a controller configured to:
display first screen information in the main region,
receive an occurrence of a first event when the first screen information is displayed on the main region, wherein the first event occurs when information is received from an external terminal,
display second information in the sub region in response to the occurrence of the first event, the second information associated with the first information in a different format, wherein the second information is a same in property as the first screen information, and
terminate the display of the first screen information in the main region when the second information is displayed in the sub region,
wherein event information related to the first event is displayed on the main region when the second information is displayed on the sub region, and
wherein, when the displaying of the event information related to the first event that is displayed on the main region is terminated, the controller displays the first screen information on the main region and terminates the displaying of the second screen information that is displayed on the sub region.

2. The electronic device of claim 1, wherein when the first event occurs, information relating to the first event is output to the main region.

3. The electronic device of claim 2, wherein when a second event occurs after the first event has occurred, the controller outputs information relating to the second event to the main region, while the information relating to the first event is being output to the main region.

4. The electronic device of claim 1, wherein when multiple events sequentially occur, the controller outputs multiple main regions that correspond to the multiple events, respectively, each region of the multiple main regions displaying information related to a corresponding event of the multiple events.

5. The electronic device of claim 1, wherein the controller outputs the second screen information to a specific position within the sub region according to a type of the first screen information.

6. The electronic device of claim 5, wherein when the first screen information is information relating to time, the controller changes the position within the sub region, to which the second screen information is output to reflect the current time.

7. The electronic device of claim 1, wherein when at least one portion of the first screen information is dragged to the sub region, the controller outputs the second screen information to a position to which the at least one portion of the first screen information is dragged.

8. The electronic device of claim 7, wherein the first screen information includes multiple graphic objects,
wherein the at least one portion of the first screen information is at least one of the multiple graphic objects, and
wherein the second screen information is information relating to the at least one graphic object.

9. The electronic device of claim 1, wherein when the second screen information that is output to the sub region is dragged to the main region in a state where the first screen information disappears from the main region, the first screen information is output back to the main region.

10. The electronic device of claim 1, wherein the main region differs in size from the sub region according to a type of the event.

11. A method of controlling an electronic device comprising a display unit including a main region and a sub region surrounding the main region, the method comprising:
displaying, on the main region, first screen information;
receiving an occurrence of a first event when the first screen information is displayed on the main region, wherein the first event occurs when information is received from an external terminal;
displaying, on a sub region, second information in the sub region in response to the occurrence of the first event, the second information associated with the first information in a different format, wherein the second information is the same in property as the first screen information; and terminating the display of the first screen information in the main region when the second information is displayed in the sub region, wherein event information related to the first event is displayed on the main region when the second information is displayed on the sub region, and wherein, when the displaying of the event information related to the first event that is displayed on the main region is terminated, displaying the first screen information on the main region and terminating the displaying of the second screen information that is displayed on the sub region.

* * * * *